United States Patent
Oswald et al.

[15] 3,686,326

[45] *Aug. 22, 1972

[54] ALLYLIC SULFIDE REACTION PRODUCTS

[72] Inventors: Alexis Oswald, Mountainside; Daniel N. Hall, Linden and Karl Griesbaum, Elizabeth, all of N.J.

[73] Assignee: Esso Research and Engineering Company

[ * ] Notice: The portion of the term of this patent subsequent to Sept. 24, 1985, has been disclaimed.

[22] Filed: Feb. 11, 1970

[21] Appl. No.: 9,126

Related U.S. Application Data

[63] Continuation of Ser. No. 584,109, Oct. 4, 1966, abandoned.

[52] U.S. Cl............260/609 R, 204/158, 260/41 A, 260/41 B, 260/45.75, 260/79, 260/79.7, 260/448.2 N, 260/455 R, 260/481 R, 260/526 S, 260/609 B, 260/830, 260/836, 260/885, 260/929, 260/948, 260/978, 424/205, 424/216, 424/287, 424/337, 260/609 D, 260/609 E, 260/609 F
[51] Int. Cl............C07c 149/06, C07c 149/10
[58] Field of Search...............260/609 A, 609 D, 609 E, 609 F

[56] References Cited

UNITED STATES PATENTS

| 2,998,346 | 1961 | Scott.............260/609 X |
| 3,403,187 | 1968 | Oswald et al.............260/609 |
| 3,405,181 | 1968 | Gourdon.............260/609 |

OTHER PUBLICATIONS

Griesbaum et al. "J. Org. Chem." Vol. 30 (1965) pp. 261-266.

*Primary Examiner*—Joseph Rebold
*Assistant Examiner*—D. R. Phillips
*Attorney*—Whelan, Chasan, Litton, Marx & Wright and D. A. Roth

[57] ABSTRACT

Open-chain, bis- and tris-sulfides are synthesized by the free radical, liquid phase addition of simple thiols to diallylic sulfides. Similarly, addition of thiol acids results in the corresponding mono- and di-thiol esters, and the poly addition of dithiols to diallylic sulfides yields terminally difunctional polythioethers. The mono- and diadduct compositions are useful as pesticides, while the poly adducts are useful in the preparation of polymers, particularly as basic ingredients for mastics compositions.

9 Claims, No Drawings

ALLYLIC SULFIDE REACTION PRODUCTS

This application is a continuation of Ser. No. 584,109, filed Oct. 4, 1966, now abandoned.

The present invention relates to novel low molecular weight addition products, cured mastic compositions formed from said products, and to pesticidal compositions containing said products. More particularly, the present invention is directed to low molecular weight addition products formed by the free radical addition of monothiols or dithiols to diallylic sulfide compounds and to vulcanizates and pesticidal compositions formed from said products.

The reaction of thiol compounds (mercaptans) with diallylic compounds has been reported in the literature. For example, Friedlander in a presentation before the Organic Chemistry Division of the American Chemical Society at the Spring, 1958, San Francisco meeting, stated that on adding radical reagents, such as thiols, to materials such as diallyl sulfide, cyclization reactions of the following type take place:

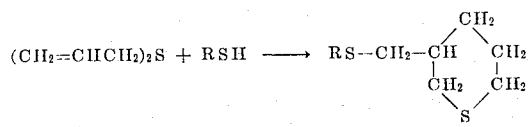

In contrast, it is stated in U.S. Pat. No. 3,075,873 that some thiol compounds, namely dialkyldithiophosphoric acids, give the following simple ionic (Markovnikov Type) diadducts with diallyl sulfides:

The polyaddition of dithiols (dimercaptans) to diolefinic compounds is a known method for polythioether synthesis (High Polymers, Volume XIII, Part III, Polyalkylene Sulfides and Other Polythioethers, Ed. N. Gaylord, Interscience Publishers, New York, 1962, Page 8). A series of papers of C. S. Marvel and co-workers starting in 1938 provides most of the original information. Marvel and A. H. Markhart (J. Polymer Sci., 6,711 (1951) have reported their attempts to use diallyl sulfide in such polyadditions but reported that diallyl sulfide was incapable of reaction with simple aliphatic dithiols such as hexamethylene dithiol.

Now, in accordance with the present invention, it has been found that both simple aliphatic and aromatic monothiols as well as thiol acids readily react with diallyl sulfide compounds in the presence of free radical catalysts to yield radical-type (anti-Markovnikov type) mono- and diadducts as opposed to the cyclic and simple ionic adducts of the prior art. Similarly, it has been found that attractive polythioethers having number average molecular weights varying from 300 to 7,000 can be formed by the free radical promoted addition of dithiols with diallyl sulfide compounds. The polythioethers formed can be readily cross-linked to vulcanizates having attractive high temperature properties.

In accordance with one embodiment of this invention, there is provided a radical type addition product having the general formula

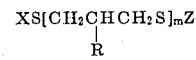

wherein R is selected from the group consisting of hydrogen and methyl; and $m$ varies from 1 to 2, wherein (1) when $m$ is 2, x and z are each selected from the group consisting of hydrogen radicals unsubstituted monovalent alkyl radicals; unsubstituted monovalent aryl radicals; substituted monovalent alkyl radicals; substituted monovalent aryl radicals; said substituted and unsubstituted alkyl and aryl radicals having from one to 50 carbon atoms; acetyl radicals; thioacetyl radicals; dialkyl substituted thiophosphoryl radicals; diaryl substituted thiophosphoryl radicals; dialkyl substituted phosphoryl radicals; and diaryl substituted phosphoryl radicals, at the alkyl and aryl substituents of said alkyl and aryl substituted thiophosphoryl and phosphoryl radicals having from one to 16 carbon atoms; and (2) when $m$ is 1, z is as previously defined and x is selected from the group consisting of allyl radicals and methallyl radicals.

In accordance with another embodiment of this invention, there is provided a radical type poly addition product having the general formula

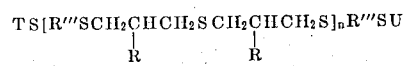

wherein R is selected from the group consisting of hydrogen and methyl; R''' is a divalent organic radical having from two to 30 carbon atoms; $n$ varies from two to 50; and T and U are each selected from the group consisting of hydrogen, 3-allylthiopropyl, 3-methallythio-2-methylpropyl, and combinations thereof.

In yet another embodiment of this invention, there is provided a radical type poly addition product having the general formula

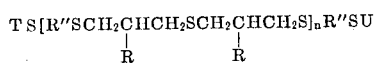

where R is selected from the group consisting of hydrogen and methyl; R'' is selected from the group consisting of $C_2$ to $C_{30}$ divalent alkylene radicals, $C_2$ to $C_{30}$ divalent unsaturated alkylene radicals, $C_8$ to $C_{30}$ bis alkylene substituted aromatic radicals, $C_6$ to $C_{30}$ divalent aromatic radicals, and substituted $C_2$ to $C_{30}$ divalent organic hydrocarbon radicals containing a substituent selected from the group consisting of sulfur, phosphorus, oxygen, and silicon; $n$ varies from one to 50; and T and U are each selected from the group consisting of hydrogen, 3-allylthiopropyl, 3-methallyl-2-methylthiopropyl, and combinations thereof.

The overall reactions contemplated by this invention may be represented by the following equations:

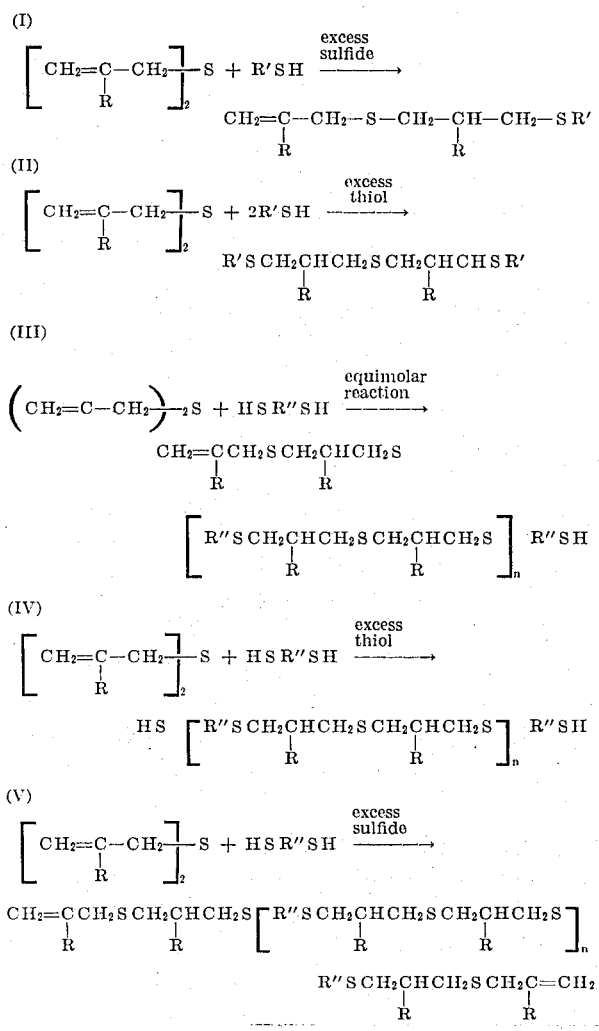

The product of equation I is the predominant reaction product formed when excess amount of allylic sulfide is reacted with a monothiol compound. The product of equation II is a diadduct of the reaction of an excess amount of monothiol compound with a diallylic sulfide compound. The product of equation III results from an equimolar reaction of a dithiol compound with a diallylic sulfide compound. The product of equation IV is the predominant product when an excess amount of dithiol compound is used in the reaction depicted. The product of equation V occurs when an excess amount of diallylic sulfide compound is reacted with the dithiol material.

The value of $n$ can vary over a wide range. Generally, $n$ ranges between 1 and 100, preferably between 1 and 50. Products finding the greatest utility as the base constituent for mastic compositions exhibit $n$ values varying from about 2 to 50. The polymeric products of this invention (equations III–V) are essentially colorless liquids or low melting solids having number average molecular weight varying from 300 to 7,000, preferably from 500 to 5,000.

The monothiol utilized as a starting material in the reaction has the general formula:

R'SH where R' is a hydrogen radical; unsubstituted monovalent alkyl and aryl radicals; substituted monovalent alkyl and aryl radicals, particularly chlorine, hydroxy, alkylthio, carboxy, and carboalkoxy substituted alkyl and aryl radicals, the substituted and unsubstituted alkyl and aryl radicals having from 1 to 50, preferably two to 30 carbon atoms; acetyl radicals; thioacetyl radicals; dialkyl and diaryl substituted thiophosphoryl radicals and dialkyl and diaryl substituted phosphoryl radicals, the alkyl and aryl substituents of the substituted thiophosphoryl and phosphoryl radicals having from one to 16 carbon atoms. Representative, nonlimiting examples of useful monothiol reagents include methanethiol, butanethiol, dodecanethiol, benzenethiol, dimethyl dithiophosphoric acid, diethyl thiophosphoric acid, thiolacetic acid, chloroethanethiol, chloroheptanethiol, hydroxyethanethiol, hydroxybutanethiol, para-methylthiobenzenethiol, carbo dodecyloxyethanethiol, etc. Highly effective insecticidal and miticidal compositions are formed when the monothiol reagents are the lower dialkyl dithiophosphoric acids such as the dimethyl and diethyl acids.

The dithiol reagent used as a starting material in the formation of polymeric substances has the general formula:

HSR''SH where R'' is a divalent organic radical having from two to 30 carbon atoms, particularly divalent hydrocarbon radicals, and divalent radicals containing either sulfur, oxygen, phosphorus or silicon in addition to hydrogen carbon atoms. Preferably, R'' is (1) a $C_2$–$C_{30}$ divalent alkylene radical, e.g., dimethylene, hexamethylene, etc.; (2) a $C_2$–$C_{30}$ divalent unsaturated alkylene radical such as 2-butene-1,4-ylene, 2-butyne-1,4-ylene, etc.; (3) a $C_8$–$C_{30}$ bis-alkylene substituted aromatic radical, e.g., p-xylylene, P-bis-dimethylene-benzene, etc.; (4) a $C_6$–$C_{30}$ divalent aromatic radical such as m-phenylene, 1,5-naphthylene, etc.; and (5) a $C_2$–$C_{30}$ divalent organic hydrocarbon radical containing either sulfur, phosphorus, oxygen or silicon in addition to carbon and hydrogen atoms such as thio-bis-ethylene, oxy-bis-ethylene, thio-bis-trimethylene, thio-bis-ethylthioethylene, dimethylsilane-bis-ethylene, etc.

Particularly preferred thiols are those compounds where R'' is a lower alkylene radical having from two to four carbon atoms since such materials are especially reactive and yield polymeric substances of outstanding resistance to auto-oxidation and hydrocarbon solvents.

The diallylic sulfide compounds used for starting materials have the general formula:

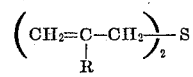

wherein R is a hydrogen or methyl radical.

The ratio of reactants present in the reaction zone has a definite effect upon the composition of the final product formed. Moreover, whether a monoadduct or a diadduct is formed from the reaction of a monothiol with a diallylic sulfide compound is determined by whether either excess sulfide or excess thiol is used in the reaction. When excess sulfide is used, the predominant product is a monoadduct, whereas when excess thiol compound is used, the predominant product is the diadduct of the diallylic sulfide compound. When monoadducts are the desired product, the molar ratio of allylic sulfide to monothiol should be maintained between about 1:1.2 to 0.1:1 When the diadduct is the desired product, the molar ratio of allylic sulfide to monothiol should be maintained in the range between about 1:2 to 1:20.

The ratio of the allylic sulfide to the thiolic compound influences not only the proportion of the mono- and the di- (or poly-) adduct formed but also the formation of by-products. These by-products are formed by the following radical cleavage processes:

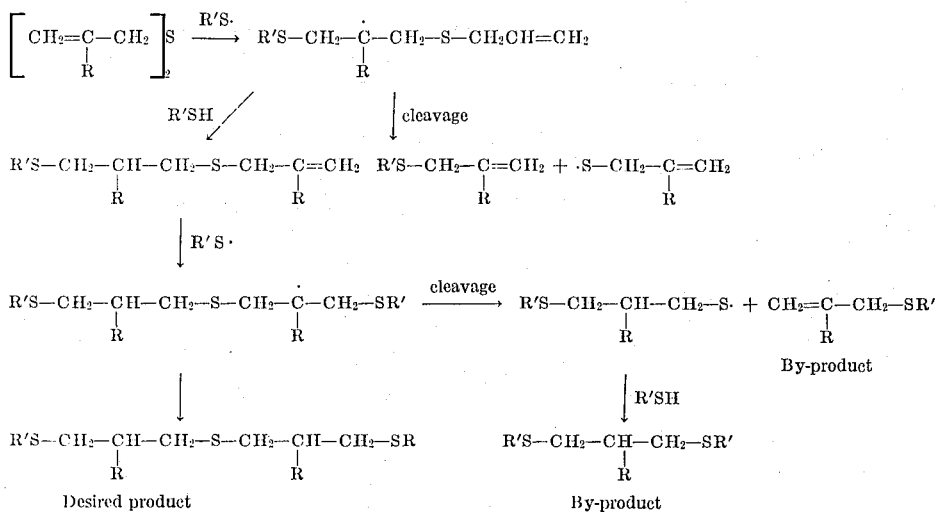

The formation of such by-products can be suppressed by the use of an excess of the thiol compound. To suppress by-product formation a smaller excess of the thiol compound is required if it has a high hydrogen atom donor ability. For example, a smaller excess of a thiol acid is sufficient.

The molecular weight of polymeric products formed by the reaction of diallylic sulfides with dithiols is strongly dependent upon the ratio of sulfide and dithiol present in the reaction zone. It has been found that when the molar ratio of sulfide to dithiol is at or near unit, high molecular weight products are formed. It was also found that the use of a large excess of either the dithiol compound or the diallyl sulfide compound, in addition to affecting the final composition of the final polymer formed, serves to markedly reduce the molecular weight of the polymer composition formed with the process.

The reaction for the production of mono- and diadducts from diallyl sulfide compound and monothiols as well as the reactions for the formation of polymeric substances wherein dithiols were employed can be carried out in bulk, in the presence of inert diluents, or with the use of water emulsion techniques. The mono- and diadducts of diallyl sulfide as well as low molecular weight polythioether compounds suitable as the base constituent in mastic compositions can be prepared most efficiently using bulk polymerization techniques, that is, carrying out the addition reaction in the absence of solvents. When higher molecular weight polythioether materials are desired, the addition reaction is preferably carried out in the presence of an inert solvent; however, high molecular weight materials can also be secured if the reaction is carried out in a typical water-surfactant emulsion system.

Useful inert solvents include saturated aliphatic hydrocarbons, halogenated saturated aliphatic hydrocarbons, aliphatic ethers, and aliphatic thioethers such as pentane, cyclohexane, dimethyl sulfide, trimethylene disulfide, etc. The use of aromatic hydrocarbons as solvents usually results in sharply reduced reaction rates and sometimes leads to undesirable side reactions.

The conditions at which the addition reaction either for the production of mono- or diadducts or for the high molecular weight polythioethers are conducted can vary over a wide range. The temperature and pressure within the reaction zone should be adjusted such that the diallylic sulfide and monothiol or dithiol reactants are in the liquid state during reaction. For bulk addition reactions, the temperatures varying from −100° to 175° C., preferably −30° to 140° C. can be used. When the compositions are formed in the presence of a solvent, temperatures varying from −30° to 140° C., preferably 0° to 50° C., are used. When emulsion techniques are utilized, the reaction should be conducted at temperatures varying from 0° to 50° C.

The reaction contemplated by this invention is not critically sensitive to pressure provided that the reaction pressure is sufficient to maintain the reactants in the liquid state at the temperatures of reaction. In general, pressures ranging from 0.5 to 10 atmospheres, preferably from one to five atmospheres, can be conveniently used. In most industrial applications, the pressure within the reaction zone will normally be the autogenous pressures exerted by the reactants.

The reaction times used in the formation of either the mono- or diadducts or the polymeric substances of this invention are not critical; however, sufficient time should be allowed for the desired monomer conversion which depends upon temperature, reactant concentration, activity of catalyst used, etc. High yields of the adduct of polythioether products are secured within the temperature and pressure limits set forth above within one to 300 hours.

While not absolutely essential to the formation of the polythioether or mono- or diadduct products, it is desirable to employ a free radical initiator in the reaction. Radiation such as ultra-violet light, gamma radiation or heat may be applied to the reactants to promote the addition reactions. Additionally, chemical initiators such as peroxides, azo compounds, etc., may also be used instead of radiation or in combination with it. Ultraviolet and gamma radiation are the preferred initiators although peroxidic initiators such as t-butylhydroperoxide, bis-t-butylperoxide, as well as materials such as bis-azobutyronitrile can also be used. The chemical initiators are employed from 0.01 to 10 wt. percent concentration, based on reactants, preferably from 0.2 to 5 wt. percent concentration.

The reaction vessel utilized for the addition reactions can be constructed of any material that is inert to the reactants and catalyst used and is capable of withstanding the operating pressures. Reaction vessels constructed of stainless steel, and glass-lined steel are satisfactory.

The mono- and diadducts of this invention formed by the reaction of diallylic sulfide compounds with monothiols, especially adducts formed from diallyl sulfide and dialkyl dithiophosphoric acid or dialkyl monothiophosphoric acid, particularly diethyldithiophosphoric acid, have outstanding contact insecticidal and miticidal properties. The insecticidal and miticidal compositions of this invention may be employed in either solid or liquid form. When used in solid form, they may be reduced to an impalpable powder and employed as an undiluted dust, or they may be admixed with a solid carrier such as clay, talc, or bentonite as well as other carriers known to the art.

The compositions may also be applied as a spray, either alone or in a liquid carrier as a solution in a solvent or as a suspension in a nonsolvent. Useful solvents include organic compounds such as acetone, ethanol, benzene, naphtha, etc., although different compounds exhibit different solubilities for the present mono- and diadduct compositions. In some instance, it may be preferable to mix the compositions with wetting agents so as to be able to secure aqueous emulsions and consequent uniformity of dispersion in the resulting colloid system. The use of wetting agents also increases the wetting action of the spray by decreasing its surface tension. This results in securing better contact of the spray with the surface being treated and, consequently, brings the active ingredient into more intimate contact with the parasite life. Suitable wetting agents include the sulfates of long-chained alcohols such as dodecanol and octadecanol, sulfonated amide or ester derivatives, sulfonated aromatic and mixed alkyl aryl derivatives, esters of fatty acids, such as the ricinoleic esters of sorbitol and petroleum sulfonates having from 10 to 20 carbon atoms per molecule. The nonionic emulsifying agents such as ethylene oxide condensation products of alkylated phenols may also be employed. The compounds of this invention may, of course, be admixed with carriers that are themselves active insecticidal and miticidal compositions.

The adducts of monothiols such as dodecanethiol and hexadecyloxy ethanethiol and dithiols such as ethanedithiol and tetramethylenedithiol with an allylic sulfide are useful as oxidation stabilizers for hydrocarbon oils and polymers. Typically, a minor amount of the stabilizer is admixed with a major amount of the hydrocarbon product. For such applications it is particularly advantageous to use the saturated di- or poly- adducts as costabilizers in admixture with hindered phenols such as 2,6-di-t-butyl-4-methyl phenol. Such a mixture shows a synergistic stabilizing effect for polymers formed from C2 to C10 alpha olefins such as polypropylene. Normally, up to 5 parts of the adduct is used per 100 parts of hydrocarbon polymer.

The polymer addition products of this invention have many uses as intermediates because of the thiol or vinyl functionality present in the polymers. However, the materials find particular utility as the base substituent for mastic compositions. The thiol terminated addition products (see equations III and IV) can be readily crosslinked to stable rubbery three-dimensional networks using a variety of techniques. For example, the polythioether product may be oxidatively vulcanized by mixing the polymers with from 1 to 20 grams per 100 grams of polymer of dimethylsulfoxide and heating the total mixture at a temperature of from 80° to 150° C. for a period ranging from 1 to 5 hours. Similarly, the thiol terminated products can be cured by admixing the polymer with an epoxide compound having at least two epoxide groups per molecule and heating the resulting mixture in the presence of an amine catalyst for a time sufficient to secure a cured network. Alternatively, these polymeric materials may be cured with diisocyanates to produce polythiourethanes. Due to their reactive thiol terminals, they can also be reacted with allylic acrylates, divinylsulfone, diacrylates and other reactive diolefinic compounds. They may also be cured by reaction with diepisulfides and the like.

Prior to curing or crosslinking operations, the polymeric addition products may be compounded with stabilizers, plasticizers or extender oils and various types of fillers. For example, carbon black, petroleum coke or mineral fillers may be incorporated into the polymer up to about 10 parts, preferably up to 200 parts, of filler per 100 parts of polymer. Among the carbon blacks that may be compounded with the polymeric addition products are the channel blacks such as ETC, MPC, HPC, etc., (these letters denoting carbon black products well known to the trade), the furnace blacks including SRF, HAF, etc., and the thermal blacks. The mineral fillers which may be used include any of the usual noncarbon black fillers or pigments such as the oxides, hydroxides, sulfides, carbonates and so forth of silicon, aluminum, magnesium, titanium, zinc or the like, or the silicates or aluminates of the various elements above indicated.

The cured mastic compositions of this invention are highly resistant to ozone and oxygen degradation even at elevated temperatures and are relatively immune to attack by organic solvents. Hence, the cured materials find particular utility in automotive applications and as gasketing materials.

The invention will be further understood with reference to the following examples.

EXAMPLE 1

A stirred mixture of 26.5 grams (0.55 moles) of methanethiol and 22.8 grams (0.2 mole) of diallyl sulfide contained in a quartz pressure tube positioned within a water bath maintained at about 15° C. was irradiated with a 100 watt medium-pressure, wide wave length range, Hanau ultraviolet immersion lamp for 8 hours. Following completion of reaction, the excess methanethiol was vented and the liquid residual product analyzed by a combination of vapor phase chromatography and proton magnetic resonance spectroscopy. The analysis indicated that the mixture was composed of about 75 mole percent 2,6,10-trithio-undecane diadduct, 10 mole percent monoadduct, 10 mole percent dimethyl trimethylene-bis-sulfide cleavage product and 5 percent other materials.

Factional distillation of the mixture under reduced pressure conditions yielded 21 grams (50 percent yield) of the diadduct having the structure $CH_3S(CH_2)_3S(CH_2)_3CH_3$ as a colorless liquid boiling at 104°–106° C. at 5 mm. of mercury pressure. The radical-type adduct structure was shown by the n.m.r. spectrum of the isolated compound. The spectrum exhibited at 1:2 proton intensity ratio for methyl and methylene protons. The ionic diadduct would have shown a 2:1 proton ratio. An elemental analysis of the product also supported the assumed product structure. The calculated elemental analysis for $C_8H_{18}S_3$ is C: 45.66, H: 8.62, S: 45.72. Found: C: 45.69; H: 8.55; and S: 46.1.

EXAMPLE 2

A mixture of 76 grams (1 mole) of thiolacetic acid and 0.4 mole of diallyl sulfide was reacted in the manner described in the previous example for 20 hours. Subsequent fractional distillation of the product in vacuo yielded 87 grams (82 percent) of a liquid diadduct fraction boiling between 140°–146° C. at 0.1 mm. of mercury. The n.m.r. spectroscopy showed that 95 percent of the product had the structure of a linear, free radical-type diadduct, i.e., $CH_3COS(CH_2)_3S(CH_2)_3SCOCH_3$.

Analysis calculated for $C_{10}H_{18}O_2S_3$: C: 45.08; H: 6.80; S: 36.11. Found: C: 45.20; H: 6.75; S: 36.36. Calculated molecular weight: 266; Found: 258.

EXAMPLE 3

A mixture of 72 grams (0.5 mole) of 4-chlorobenzenethiol and 23 grams (0.2 mole) diallyl sulfide in 1,000 ml n-heptane solvent was irradiated as described in Example 1 for 500 hours to yield allyl 4-chlorophenyl sulfide, 3-(allylmercapto)-propyl 4-chlorophenyl sulfide and bis-3 -(4-chlorophenylmercapto)-propyl sulfide.

EXAMPLE 4

A stirred mixture of 22.5 grams (0.21 mole) of distilled diethyldithiophosphoric acid and 11.4 grams (0.1 mole) of diallyl sulfide contained in a quartz pressure vessel positioned within a water bath maintained at 15° percent C. was irradiated with a 100 watt medium pressure, wide wave length range, Hanau ultraviolet immersion lamp. Samples of the reaction mixture were taken periodically during the course of the reaction. Nuclear magnetic resonance spectra of the reaction mixture indicated that in 30 minutes, 50 percent of the diethyldithiophosphoric acid was chemically added to the diallyl sulfide. After 24 hours of irradiation, no more dithiophosphoric acid was left unreacted. The product formed was then solubilized in benzene and washed with a 5 percent aqueous sodium carbonate solution. Following the washing operation, the benzene was distilled from the mixture and the residue stripped at 60° C. under a nitrogen atmosphere at 0.7 mm. of mercury pressure to remove the unreacted diallyl sulfide. The resulting residue was a clear, slightly yellow liquid product weighing 25 grams.

Analysis of the product using n.m.r. techniques indicated the presence of about 60 percent monoadduct and 40 percent diadduct. No branched, ionic type adducts were present. A molecular weight determination by vapor pressure osmometry indicated a similar ratio of mono- and diadduct. The calculated molecular weight for the monoadduct was 300 and for the diadduct 487. The determined molecular weight for the product formed was 376.

EXAMPLE 5

Following the procedure of Example 4, a mixture of 46 grams (0.25 mole) of diethyldithiophosphoric acid and 11.4 grams (0.1 mole) of diallyl sulfide was reacted and subsequently purified to yield 39 grams of a yellow liquid product. Nuclear magnetic resonance spectra analysis of the product indicated that it was a mixture of about 86 percent of the radical type di- and 13 percent of the radical type monoadduct, i.e. $[(C_2H_5O)_2P(S)S(CH_2)_3]_2$ and $(C_2H_5O)_2P(S)S(CH_2)_3SCH_2CH=CH_2$. This conclusion was supported by the following analysis: the calculated molecular weight for diadduct: 487; the determined molecular weight for the product obtained was 438. The calculated elemental analysis for the diadduct, $C_{14}H_{32}O_4P_2S_5$, was C: 34.55; H: 6.62; O: 13.15; P: 12.13; and S: 32.95. The elemental analysis of the product revealed the following: C: 34.85; H: 6.55; O: 13.0; P: 12.53; and S: 33.0.

EXAMPLE 6

Samples (0.1 gram) of the products of Examples 4 and 5 are dissolved in 2 ml of acetone and dispersed in 200 ml of distilled water with 0.1 ml of a Triton X-100 emulsifier. In one test some of the resulting 0.05 percent aqueous emulsions were used to spray lima bean leaves on the dorsal and ventral surfaces. These leaves were then offered for a 48-hour feeding period to ten larvae of the Mexican Bean Beetle. In another test lima bean plants were infested with 50 to 100 adults of the strawberry spider mite, Tetranychus Antlanticus, and then dipped into the test emulsions.

Mortality determinations up to 48 hours showed that all the Mexican Bean Beetles were killed by both sprays. In the case of the spider mites, the predominantly monoadduct product of Example 4 showed 89 percent mortality, the predominantly diadduct product of Example 5 showed 88 percent mortality after 5 days. The beetles and mites on the leaves treated only with water and emulsifier show no mortality.

EXAMPLE 7

In another series of experiments, the products described in Examples 1–4, were tested against flies, roaches, fungi and nematodes. The results of these test, as shown in the table, indicate that the products of the present invention have a wide spectrum pesticidal activity.

TABLE I
Control of Pest at a Given Concentration of Product

| Product from example | Structure of product | House flies | | Roaches | | | Product concentration at 50% pest control, L₍ 50 (percent) | | |
|---|---|---|---|---|---|---|---|---|---|
| | | Product concentration (percent) | Pest control (percent) | Product concentration (percent) | Pest control (percent) | | Alternaria solani | Monila fructicola | Panagrellus nematode |
| | | | | | Male | Female | | | |
| 1 | $[CH_3S(CH_2)_3]_2S$ | 2.5 | 30 | 1.0 | 100 | 60 | 0.01 | 0.01 | 0.001 > |
| 2 | $[CH_3COS(CH_2)_n S$ | 2.5 | 60 | 1.0 | 80 | 60 | 0.001 | 0.001 < | 0.01 > |
| 4 | $[(C_2H_5O)_2P(S)S(CH_2)_3]_2S$ [a] | 2.5 | 100 | 2.5 | 100 | 80 | 0.01 | 0.01 | 0.001 > |
| | | 0.1 | 47 | | | | | | |
| 5 | $(C_2H_5O)_2P(S)S(CH_2)_3SCH_2CH=CH_2$ [b] | 2.5 | 100 | 2.5 | 100 | 100 | 0.01 < | 0.001 > | 0.001 |
| | | 0.05 | 23 | | | | | | |

[a] Bis (diethyl thiophosphoryl-mercaptopropyl) sulfide.
[b] O,O'-diethyl-S-allylmercaptopropyl dithiophosphate.

EXAMPLE 8

A mixture of 135 grams (1.25 moles) of trimethylenedithiol and 143 grams (1.25 moles) or di-allyl sulfide was charged into a quartz reaction vessel which was equipped with a magnetic stirrer and a nitrogen bubbler. The reaction vessel was positioned within a thermostating water bath maintained at 15° C. The reactants were then irradiated with constant stirring under a nitrogen atmosphere with a 75 watt Hanau high pressure mercury immersion lamp for 24 hours. At the completion of the reaction period, the originally colorless liquid product turned into a white semi-solid. Examination of samples taken from the reacting mixture at various time intervals, by nuclear magnetic resonance spectroscopy showed that this apparent change in physical state was preceded by a gradual decrease of allylic groups present in the reaction zone to about one-fifth of the original value after 24 hours.

The crude reaction mixture recovered was then dissolved in 560 ml of benzene and the resulting solution added drop-wise to 2,500 ml of chilled methanol which caused the precipitation of the solid polymer. The solid polymer was then recovered from the methanol by suction filtration and the material washed with additional cold methanol and dried in vacuo. A 73 percent yield (275 grams) of purified polymer melting between 55° and 58° C. was obtained. Nuclear magnetic resonance spectroscopy of the product showed the two types of characteristic methylene signals for the trimethylenethioether repeating units in a 1:2 relative intensity. The n.m.r. analysis also indicated the presence of approximately equal numbers of allyl and thiol groups. This suggests that the polymer was an alpha-allyl-omega-mercapto-polytrimethylenesulfide.

The molecular weight of the polymer was found to be 1,845 as determined by osmometry in benzene.

The molecular weight of the polymer formed was further increased by reacting the polymer with further amounts of dithiol compounds such as trimethylenedithiol thereby converting the terminal allyl functionality on the original polymer to thiol termination. In similar fashion, the terminal functionality of thiol terminated polythioethers was modified by reacting the polymer with an unsaturated alcohol such as allyl alcohol. Additionally, the polymer structure can be modified by reacting a thiol terminated polythioether with a di-functional reagent such as ethylenediacrylate.

EXAMPLE 9

The polyadduct of Example 8 and the reaction products resulting from its conversion with trimethylenedithiol and allyl alcohol were examined by thermogravimetric analyses. Samples of the three polymers were heated at a temperature rise of ° C. per minute in both a nitrogen atmosphere and air. Temperatures were recorded as the polymers lost 1, 10, 50, 90 and 95 per cent of their weight. The data obtained are tabulated in Table II below.

The tabulation shows that all three polymers are stable below 250° C. It should be noted that the stability of the polymers on heating is almost the same in air as it is in a nitrogen atmosphere. This points to an outstanding resistance towards autoxidation. It is believed that the thioether sulfur of these polymers is an effective antioxidant for the relatively short aliphatic hydrocarbon segments present in the polymer.

TABLE II

| Polymer structure | Atmosphere | Temperature of percent weight loss | | | | |
|---|---|---|---|---|---|---|
| | | 1 | 10 | 50 | 90 | 05 |
| $CH_2=CHCH_2(SCH_2CH_2CH_2)_nSH$ | Nitrogen | 255 | 326 | 350 | 364 | R |
| | Air | 247 | 314 | 336 | 344 | 345 |
| $HSCH_2CH_2CH_2(SCH_2CH_2CH_2)_nSH$ | Nitrogen | 291 | 338 | 354 | 362 | 367 |
| | Air | 275 | 318 | 335 | 345 | R |
| $HOCH_2CH_2CH_2(SCH_2CH_2CH_2)_n$-$SCH_2CH_2CH_2OH$ | Nitrogen | 250 | 331 | 355 | 365 | |
| | Air | 248 | 318 | 341 | 349 | 350 |

EXAMPLE 10

Following the procedure of Example 8, 0.1 to 0.2 mole of various types of purified dithiols were reacted with equimolar amounts of distilled diallyl sulfide (boiling point 76° to 77° C. at 109 mm. of mercury). Upon completion of the reaction, the crude products were heated at temperatures varying from 50° to 100° C. at pressures ranging from 1.0 to 0.5 mm. of mercury for 24 hours to remove starting materials. The resulting residue was then dissolved in benzene and added dropwise to 5 volumes of stirred chilled methanol. The resulting precipitates were then dried at 125° C. at pressures between about 1.0 to 0.5 ml of mercury and then submitted for molecular weight analysis. The results of the polymerization tests are set forth in Table III below.

EXAMPLE 12

A stirred, nitrogenated mixture of 28.5 grams (0.25 mole) of diallyl sulfide and 36 grams (0.3 mole) of tetramethylenedithiol was irradiated with the lamp of Example 1 for 96 hours at 16° C. The resulting crude product was heated with nitrogen bubbling at 14° C. for 2½ hours to remove the volatiles. As a distillation residue, 58 grams (90 percent) of a colorless liquid product was obtained. It osmotic molecular weight was found to be 559. The calculated molecular weight for the trimer having the general formula $HS[(CH_2)_4S(CH_2)_3S(CH_2)_3S]_3(CH_2)_4S(CH_2)_3SCH_2—CH=CH_2(n=3)$ is 536. The product was found to have the expected thiol functionality of one by titration with methyl magnesium bromide.

The calculated elemental analysis for $[C_{10}H_{20}S_3]_n$ is

TABLE III

| Run | reagent | Chemical initiator | U.V. irradiation (hours) | Crude yield (percent) | Ebullioscopic (mol. wt.) | Elemental analysis (percent) | | |
|---|---|---|---|---|---|---|---|---|
| | | | | | | C | H | S |
| 1 | p-Xylylene dimercaptan | $(CH_3)_3COOH$ [a] | 9 | 88 | 851 | | | |
| 2 | Ethylene dimercapto acetate | $(CH_3)_3COOH$ [a] | 48 | 56 | 749 | 41.07 | 5.73 | 29.68 |
| 3 | 1,2-Propane dithiol | None | 48 | 67 | 827 | 49.38 | 8.09 | 42.91 |
| 4 | p-Menthane dithiol | None | 50 | 79 | 478 | 60.11 | 9.40 | 39.35 |
| 5 | p-Xylylene dimercaptan | None [b] | 48 | >50 | 860 | | | |
| 6 | Ethane dithiol | None | 48 | >50 | 603 | | | |

[a] 70 cc. benzene solvent.
[b] 10 cc. benzene solvent.

The data set forth in Table III above indicates that various types of low molecular weight polythioether addition products can be formed by the free radical addition reaction of aliphatic and aromatic dithiols with diallylsulfide.

EXAMPLE 11

A stirred, nitrogenated mixture of 50 grams (0.24 mole) of 1,10-decanedithiol and 27.5 grams (0.24 mole) of diallyl sulfide was irradiated with the lamp of Example 1 for 18 hours at 16° C. To avoid polymer precipitation, the mixture was heated by lamp heat to 40° C. and irradiated at that temperature for an additional 40 hours. After the reaction, the mixture was allowed to cool to ambient temperature, where it solidified. The crude product was added to 500 ml. of stirred pentane in which it partly dissolved. The undissolved part (15 grams) was recrystallized from 600 ml. of a 1:1 mixture of benzene and heptane to yield 9 grams of white, powder-like solid of 1,280 molecular weight as determined by vapor pressure osmometry. The powder product was believed to have the general formula: HS $[(CH_2)_{10}S(CH_2)_3S(CH_2)_3S]_{n-1}(CH_2)_{10}S(CH_2)_3SCH_2—CH=CH_2$.

The calculated elemental analysis for $(C_{16}H_{32}S_3)_n$ is C: 59.94; H: 10.06; S: 30.00. The determined elemental analysis was C: 60.50; H: 9.95; S: 30.44.

From the pentane extract, on cooling to −15°C., 12 grams of a waxy, white solid was obtained. The molecular weight of this latter product faction was 660 as determined by vapor pressure osmometry.

C: 50.80; H: 8.52; S: 40.68. The determined elemental analysis was C: 50.77; H: 8.39; S: 41.44.

EXAMPLE 13

A stirred and nitrogenated mixture of 54 grams (0.5 mole) trimethylene dithiol and 71 grams (0.5 mole) di-(β-methallyl sulfide was irradiated with ultraviolet light at 16° C. for 96 hours. During the reaction period the mixture gradually turned orange-brown. However, on heating in vacuo it lost its color. After 2 hours at 140°–150° C. under 0.25 mm, 105 grams (84 percent) of an almost colorless liquid product was obtained. The n.m.r. analysis indicated that it had allylic unsaturation. An osmotic molecular weight determination gave a value of 709. The calculated value for the oligomer is 750 having the general formula:

The calculated elemental analysis for $[C_{11}H_{22}S_3]_n$ is C: 52.75; H: 8.85; S: 38.40. The elemental analysis of the product was C: 53.38; H: 8.94; S: 37.39.

EXAMPLE 14

A stirred mixture of 25.6 grams (0.18 mole) di-(β-methallyl sulfide and 54 grams (0.5 mole) trimethylenedithiol was reacted at 16° C. for 21 hours under the effect of ultraviolet irradiation. The resulting brownish-orange product was heated under nitrogen at 145° C. under 0.15 mm. to remove all the volatile components. This resulted in 54 grams of a colorless, slightly viscous product. An n.m.r. spectrum of the product showed only a trace of unsaturation. Determination of molecular weight by the osmotic method in benzene solution gave a value of 475. The calculated value for the diadduct ($n=1$) and the triadduct ($n=2$) is 358 and 608, respectively.

It is to be understood that this invention is not limited to the specific examples which have been offered merely as illustrations and that modifications may be made without departing from the spirit of the invention.

What is claimed is:

1. A radical type polyaddition product having the general formula

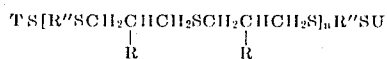

wherein R is selected from the group consisting of hydrogen and methyl; R'' is selected from the group consisting of dimethylene, tetramethylene, hexamethylene, 2-butene-1,4-ylene,2-butyne-1,4-ylene, p-xylylene, p-bis-dimethylene-benzene, thio-bis-ethylene, oxy-bis-ethylene, thio-bis-ethylthioethylene and dimethyl silane-bis-ethylene; $n$ is an integer; and T and U are each selected from the group consisting of hydrogen, 3-allyl-thiopropyl, 3-methallyl-2-methylthiopropyl, and mixtures thereof; said product having a molecular weight of about 500 to about 5,000.

2. The product of claim 1 wherein R is methyl.

3. The product of claim 1 wherein T and U are hydrogen.

4. The product of claim 1, wherein R'' is 2-butene-1,4-ylene, 2-butyne-1,4-ylene, p-xylylene, or p-bis-dimethylenebenzene.

5. A radical type polyaddition product having the general formula

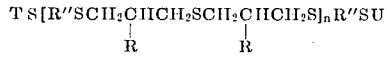

wherein R'' is selected from the group consisting of dimethylene, trimethylene, tetramethylene, hexamethylene, 2-butene-1,4-ylene, 2-butyne-1,4-ylene, p-xylylene, p-bis-dimethylene-benzene, thio-bis-ethylene, oxy-bis-ethylene, thio-bis-trimethylene, thio-bis-ethylthioethylene and dimethyl silane-bis-ethylene; n is an integer; and T and U are each selected from the group consisting of hydrogen, 3-allylthiopropyl, 3-methallyl-2-methylthiopropyl, and mixtures thereof; said product having a molecular weight of about 500 to about 5000.

6. The product of claim 5, wherein R'' is 2-butene-1,4-ylene, 2-butyne-1,4-ylene, p-xylylene, or p-bis-dimethylenebenzene.

7. A radical type polyaddition product having the general formula

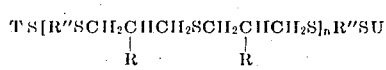

wherein R is selected from the group consisting of hydrogen and methyl; and R'' is trimethylene or thio-bis-trimethylene $n$ is an integer; and T and U are each selected from the group consisting of hydrogen, 3-allylthiopropyl, thiopropyl, 3methallyl-2-methylthiopropyl, and mixtures thereof; said product having a molecular weight of about 500 to about 5,000.

8. A radical-type polyaddition product having the general formula

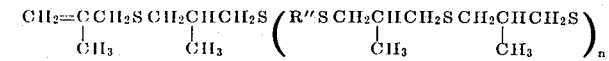
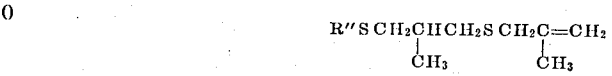

erein R'' is a lower alkylene radical having from two to four carbon atoms; and $n$ is an integer; said product having a molecular weight of about 500 to about 5,000.

9. The product of claim 8 wherein R'' is trimethylene.

* * * * *